(12) United States Patent
Park

(10) Patent No.: US 7,731,792 B2
(45) Date of Patent: Jun. 8, 2010

(54) METHOD OF PRODUCING RECYCLED HARDENED MATERIALS USING WASTE GYPSUM

(75) Inventor: Jong-Won Park, 176 Komo-ri, Jillye-myeon, Kimhae-si, Kyeongsangnam-do 621-881 (KR)

(73) Assignee: Jong-Won Park, Jillye-myeon, Kimhae-si, Kyeongsangnam-do (KR)

( * ) Notice: Subject to any disclaimer, the term of this patent is extended or adjusted under 35 U.S.C. 154(b) by 283 days.

(21) Appl. No.: 11/794,879

(22) PCT Filed: Jul. 7, 2005

(86) PCT No.: PCT/KR2005/000052

§ 371 (c)(1),
(2), (4) Date: Jul. 6, 2007

(87) PCT Pub. No.: WO2006/073215

PCT Pub. Date: Jul. 13, 2006

(65) Prior Publication Data

US 2008/0066651 A1    Mar. 20, 2008

(51) Int. Cl.
*C04B 11/26*    (2006.01)
*C04B 14/00*    (2006.01)

(52) U.S. Cl. .............. 106/708; 106/672; 106/675; 106/677; 106/679; 106/680; 106/661; 106/667; 106/697; 106/698; 106/704; 106/705

(58) Field of Classification Search ............... 106/672, 106/675, 677, 679, 667, 661, 680, 697, 698, 106/704, 705, 708
See application file for complete search history.

(56) References Cited

U.S. PATENT DOCUMENTS

| 4,339,273 A | 7/1982 | Meier et al. |
| 5,338,357 A | 8/1994 | Takai et al. |
| 5,346,549 A | 9/1994 | Johnson |
| 5,362,319 A | 11/1994 | Johnson |

FOREIGN PATENT DOCUMENTS

| EP | 678488 B1 | 9/1998 |
| JP | 06-144898 | 5/1994 |
| JP | 2000-344564 | 12/2000 |

OTHER PUBLICATIONS

Abstract of KPA 1020030049959, Jan. 21, 2005.*

* cited by examiner

*Primary Examiner*—Elizabeth D Wood
(74) *Attorney, Agent, or Firm*—Renner Otto Boisselle & Sklar, LLP

(57) ABSTRACT

Disclosed herein is a method for producing a recycled hardened material using waste gypsum. The method comprises treating acidic wastewater generated in the production of copper, zinc or titanium or the production of sodium hydroxide (caustic soda) and chlorine using saline water, with calcium hydroxide (slaked lime), so as to precipitate sludge, and mixing the precipitated sludge with pulp sludge ashes having pozzolanic properties.

8 Claims, No Drawings

METHOD OF PRODUCING RECYCLED HARDENED MATERIALS USING WASTE GYPSUM

TECHNICAL FIELD

The present invention relates to a method for producing a recycled hardened material using waste gypsum. More particularly, a method for producing a recycled hardened material using waste gypsum, which is hardened at room temperature rapidly and cost-effective, the method comprising treating acidic wastewater generated in the production of copper, zinc or titanium or the production of sodium hydroxide (caustic soda) and chlorine using saline water, with calcium hydroxide (slaked lime), so as to precipitate sludge, and kneading the precipitated sludge with pulp sludge ashes having pozzolanic properties.

BACKGROUND ART

Pulp sludge ashes generated by the incineration of pulp sludge in a papermaking process are used as cement additives, etc., because of hydraulic properties (i.e., pozzolanic properties). However, the majority of these pulp sludge ashes are buried in landfills, since methods capable of increasing their added value are insufficient in view of the amount of their generation.

Acidic wastewater generated in the production of copper, zinc or titanium or the production of sodium hydroxide or chlorine by the electrolysis of seawater or salt-dissolved water (hereinafter, referred to as saline water) is neutralized with calcium hydroxide to form sludge. The sludge is dehydrated to a water content of 60-80% to form so-called "waste gypsum". This reaction is illustrated by the following equation:

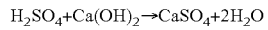

$$H_2SO_4 + Ca(OH)_2 \rightarrow CaSO_4 + 2H_2O$$

The waste gypsum has a chemical molecular formula of $CaSO_4$ which is the same as that of general gypsum. However, the waste gypsum has different chemical properties from general gypsum, so that it has no hydraulic properties even when it is not only in a wet state but also dehydrated by drying. Particularly, at a water content of 60-80%, the gypsum cannot provide a hardened material having strength sufficient to make handling easy, even when it is mixed with a cement having special composition. Thus, it was difficult to provide a cost-effective composition using the waste gypsum.

Although the waste gypsum is generated in various industrial fields at very large amounts, there are no methods of treating harmful components contained in the waste gypsum and recycling the waste gypsum in an economic manner. For this reason, it is buried in the underground at many costs, thus increasing the expense of manufacturers for wastewater disposal and causing environmental contamination.

DISCLOSURE OF THE INVENTION

Therefore, the present invention has been made in view of the above-mentioned problems, and it is an object of the present invention to provide a method for producing a recycled hardened material using waste gypsum, which is hardened rapidly by the waste gypsum with pulp sludge ashes having pozzolanic properties, thus showing excellent strength in an early stage.

Another object of the present invention is to provide a method for producing recycled hardened material using waste gypsum, from which heavy metals harmful to the human body are not released and which has increased waster resistance.

Still another object of the present invention is to provide a method for producing a recycled hardened material using waste gypsum, which is excellent in lightweight, flame retardancy and insulation properties and can be used as building materials.

To achieve the above objects, the present invention provides a method for producing a recycled hardened material using waste gypsum, the method comprising the steps of: dehydrating sludge generated from the treatment of acidic wastewater or saline water by means of a filter press so as to form waste gypsum having a water content of 60-80%; adding water to the waste gypsum at a ratio of 1 (waste gypsum): 1-1.6 (water) so as to prepare slurry; and mixing the slurry with dry pulp sludge ashes.

In the inventive method, the mixing ratio between the pulp sludge ashes, the waste gypsum and the water is preferably 50-65 wt %: 10-25 wt %: 10-40 wt %.

Preferably, the recycled hardened material produced according to the present invention additionally contains a polymer emulsion at an amount of 5-30 wt % based on the weight of the water.

Preferably, the polymer emulsion is at least one selected from the group consisting of PVA, EVA, acrylic, urea, melamine, vinyl acetate and silicone resins.

Preferably, the inventive recycled hardened material additionally contains at least one selected from the group consisting of sand, gravel, waste foundry sand, zinc slag, copper slag, and waste concrete.

For the purpose of lightweight, preferably, the inventive recycled hardened material additionally contains at least one selected from the group consisting of pearlite, vermiculite, talc, calcium carbonate, crushed polystyrene foam, crushed polyurethane foam and wood powder.

Preferably, the inventive recycled hardened material contains bubbles formed by applying compressed air to an animal/vegetable foaming agent or a mineral foaming agent.

Preferably, the inventive recycled hardened material additionally contains at least one cure-controlling agent selected from the group consisting of aluminum sulfate, quick lime, magnesium chloride, calcium chloride and sodium silicate.

BEST MODE FOR CARRYING OUT THE INVENTION

Hereinafter, the inventive method for producing the recycled hardened material using the waste gypsum will be described in detail.

The present inventors have found that, when the pulp sludge ashes and the waste gypsum are mixed with water at an equivalent ratio at which they can undergo hydraulic reaction, an exothermic reaction will occur while they are hardened rapidly. On the basis of this finding, we have determined the optimal mixing ratio between the waste gypsum, the pulp sludge ashes and the water, by various experiments, and found that the additional use of a polymer emulsion results in improvements in the strength and water resistance of the hardened material, thus preventing the dissolution and release of harmful components contained in the pulp sludge ashes and the waste gypsum.

In the inventive method for producing the recycled hardened material using the waste gypsum, sludge generated from the treatment of acidic wastewater or saline water is first dehydrated by means of a filter press so as to form waste gypsum having a water content of 60-80%. This waste gypsum with a water content of 60-80% is in a viscous and sticky state like dilute mud.

To the waste gypsum, water is added to make slurry. Here, the mixing ratio between the waste gypsum and the water is preferably 1-1.6

As the slurry consisting of a mixture of the waste gypsum and water is mixed with dry pulp sludge ashes, it is hardened rapidly within a short time of, generally, 30 minutes.

At this time, the optimal mixing ratio between the pulp sludge ashes, the waste gypsum and the water is preferably 50-65 wt %: 10-25 wt %: 10-40 wt %.

In mixing the pulp sludge ashes, the waste gypsum and the water with each other so as to make a hardened material, if the amount of the water is less than 25 wt %, the mixing will become difficult, and if it is more than 65 wt %, the formation of the hardened material will become difficult.

Furthermore, to the above-described composition of the hardened material, a polymer emulsion may also be added, resulting in a great increase in the strength and water resistance of the hardened material. Because of such a great increase in water resistance, harmful components remaining in the waste gypsum or the pulp sludge ashes, which can be dissolved and released during the use of the hardened material, will remain solidified within the hardened material, so that they will not be released to the external environment.

Examples of the polymer emulsion which can be used in the present invention include PVA, EVA, acrylic, urea, melamine, vinyl acetate and silicone resins. The polymer emulsion is preferably used at an amount of 5-30 wt % based on the weight of the water.

Also, the hardened material may contain various additives depending on the purpose. For example, in order to make strength excellent, the hardened material may contain sand, gravel, waste foundry sand, zinc slag, copper slag, waste concrete, or the like. For the purpose of lightweight, it may contain pearlite, vermiculite, talc, calcium carbonate, crushed polystyrene foam, crushed polyurethane foam, wood powder, or the like. Also, it may contain bubbles formed by formed by applying compressed air to an animal/vegetable foaming agent or a mineral foaming agent. In addition, a cure-controlling agent may also be added depending on the physical properties of the additives, the waste gypsum and the pulp sludge ashes.

Examples of the cure-controlling agent, which can be used in the present invention, include aluminum sulfate, quick lime, magnesium chloride, calcium chloride or sodium silicate.

Moreover, the hardened material may contain fibrous materials such as fiber chips, and pulp sludge containing large amounts of staple fibers, so as to enhance the strength.

The hardened material produced according to the above-described method can provide excellent lightweight, flame retardancy and insulation properties in industrial fields, and can be used in various shapes or forms. Particularly, it can be used frequently as building materials, etc.

Hereinafter, the inventive method for producing the recycled hardened material using the waste gypsum will be described in further detail by the following examples.

For use in the following examples, pulp sludge ashes generated from Hansol Paper Co. were prepared, and acidic wastewater from Hyundai Titanium Co., Ltd and LG-Nikko Copper Inc., Ltd. was neutralized with calcium hydroxide so as to form waste gypsum having a water content of 75%. Also, wastewater generated from saline water treatment in Dong Yang Chemical Co., Ltd. was used to prepare waste gypsum having a water content of 75%.

Example 1

Hardened Material Produced by Mixing of Waste Gypsum with Pulp Sludge Ashes 30 g of waste gypsum with a water content of 75% generated from acidic wastewater treatment was mixed with 50 g of water to make a slurry mixture. The slurry mixture was mixed with 90 g of dry pulp sludge ashes to prepare a hardened material. The hardened material thus prepared was measured for hardening time and strength at different days, and the measurement results are shown in Table 1.

Example 2

Hardened Material Produced by Mixing of Waste Gypsum from Saline Water Treatment with Pulp Sludge Ashes 30 g of waste gypsum with a water content of 75% generated from saline water treatment in processes was mixed with 50 g of water to make a slurry mixture. The slurry mixture was mixed with 90 g of dry pulp sludge ashes to prepare a hardened material. The hardened material thus prepared was measured for hardening time and strength at different days, and the measurement results are shown in Table 1.

Comparative Example 1

Hardened material Produced by Mixing of Waste Gypsum from Acidic Treatment with Portland Cement 30 g of waste gypsum with a water content of 75% generated from acidic wastewater treatment was mixed with 50 g of water so as to make a slurry mixture. The slurry mixture was mixed with 90 g of dry Portland cement to prepare a hardened material. The hardened material thus prepared was measured for hardening time and strength at different days, and the measurement results are shown in Table 1.

Comparative Example 2

Hardened Material Produced by Mixing of Waste Gypsum from Saline Water Treatment with Portland Cement 30 g of waste gypsum with a water content of 75% generated from saline water treatment was mixed with 50 g of water to make a slurry mixture. The slurry mixture was mixed with 90 g of dry Portland cement to prepare a hardened material. The hardened material thus prepared was measured for hardening time and strength at different days, and the measurement results are shown in Table 1.

TABLE 1

Measurement results of hardening time and strength of various compositions

| Samples | Hardening time (hour) | Strength at day 1 (kg/cm$^2$) | Strength at day 3 (kg/cm$^2$) | Strength at day 7 (kg/cm$^2$) | Strength at day 28 (kg/cm$^2$) |
|---|---|---|---|---|---|
| Example 1 | 0.5 | 110 | 120 | 150 | 172 |
| Example 2 | 0.58 | 96 | 104 | 142 | 167 |
| Comparative Example 1 | 25 | 0 | 20 | 42 | 62 |
| Comparative Example 2 | 25 | 0 | 18 | 36 | 61 |

As can be seen in Table 1, the hardened materials produced according to Examples 1 and 2 were hardened rapidly within about 0.5 hours, whereas the hardened materials produced in Examples 1 and 2 were hardened slowly over about 25 hours. Also, it could be seen that, in strength at different days, the hardened materials produced in Examples 1 and 2 were at least three times higher that those of the hardened materials produced in Comparative Examples. Accordingly, it can be found that the hardened materials produced by adding pulp sludge ashes to waste gypsum which is not hardened under natural conditions were excellent in terms of hardening times and strength as compared to those produced by adding general Portland cement.

Example 3

Hardened Material Containing Polymer Emulsion

To the composition of Example 1, a polymer emulsion was added at amounts of 1%, 3%, 5%, 10%, 20% and 30% based on the weight of the water. After 28 days, the resulting compositions were measured for water resistance, and the measurement results are shown in Table 2 below.

TABLE 2

Measurement results of water resistance of compositions containing different concentrations of emulsion, after 28 days

| Sample | Concentration of polymer emulsion | PVA | EVA | Acrylic resin | Urea resin | Melamine resin | Silicone resin |
|---|---|---|---|---|---|---|---|
| 1 | 1% | Absorbed water | Absorbed water | Absorbed water | Absorbed water | Absorbed water | Water-proofed |
| 2 | 3% | Absorbed water | Absorbed water | Water-proofed | Absorbed water | Absorbed water | Repelled water |
| 3 | 5% | Water-proofed | Water-proofed | Water-proofed | Absorbed water | Absorbed water | Repelled water |
| 4 | 10% | Water-proofed | Water-proofed | Water-proofed | Repelled water | Water-proofed | Repelled water |
| 5 | 20% | Repelled water | Water-proofed | Repelled water | Repelled water | Water-proofed | Repelled water |
| 6 | 30% | Repelled water | Water-proofed | Repelled water | Repelled water | Water-proofed | Repelled water |

As can be seen in Table 2, the composition containing the polymer emulsion at an amount of more than 5 wt % based on the weight of the water showed waterproof property, and the composition containing the polymer emulsion at an amount of more than 20 wt % showed water-repellent property. Also, it could be seen that the strength of the hardened material produced in Example 3 was higher than that of the hardened material produced in Example 3.

Furthermore, in order to examine if harmful components in the composition are dissolved and released, the hardened material of Example 1 and each of the silicone resins 5 and 6 in Example 3 were immersed in distilled water, and the solution was analyzed by the drinking water quality analysis method. The analysis results are shown in Table 3 below.

TABLE 3

Test results for dissolution and release of harmful components in compositions containing polymer emulsion, after 28 days

| No. | Tested items | Standard (ml) | Example 1 | Sample 5 of Example 3 | Sample 6 of Example 3 |
|---|---|---|---|---|---|
| 1 | Lead or its compounds | More than 3.0 | 0.325 | Not detected | Not detected |
| 2 | Copper or its compound | More than 3.0 | 0.141 | Not detected | Not detected |
| 3 | Arsenic or its compounds | More than 1.5 | 0.120 | Not detected | Not detected |
| 4 | Mercury or its compounds | More than 0.005 | Not detected | Not detected | Not detected |
| 5 | Cadmium or its compounds | More than 0.3 | 0.06 | Not detected | Not detected |
| 6 | Hexavalent chromium compounds | More than 1.5 | 0.31 | Not detected | Not detected |
| 7 | Cyanides | More than 1.0 | Not detected | Not detected | Not detected |
| 8 | Organophosphorus compounds | More than 1.0 | Not detected | Not detected | Not detected |
| 9 | tetrachloroethylene | More than 0.1 | Not detected | Not detected | Not detected |
| 10 | Trichloroethylene | More than 0.3 | Not detected | Not detected | Not detected |

TABLE 3-continued

Test results for dissolution and release of harmful components
in compositions containing polymer emulsion, after 28 days

| No. | Tested items | Standard (ml) | Example 1 | Sample 5 of Example 3 | Sample 6 of Example 3 |
|---|---|---|---|---|---|
| 11 | pH | Waste acid: less than 2.0 Alkali: more than 12.5 | 6.4 | 7.0 | 7.0 |
| 12 | Oil components | More than 5% | Not detected | Not detected | Not detected |

As can be seen in Table 3, the hardened material of Example 1 containing no polymer emulsion released trace amounts of harmful components, and the samples 5 and 6 of Example 3 whose water resistance has been improved by the polymer emulsion did not release harmful components.

Example 4

Hardened Material Containing Aggregate

The PVA sample 6 of Example 3 was mixed with each of 60 g of sand (sample 1), 40 g of sand and 20 g of aggregate (sample 2), 60 g of waste foundry sand (sample 3), 60 g of zinc slag (sample 4), 60 g of copper slag (sample 5) and 50 g of waste concrete aggregate (sample 6). Each of the prepared samples 1-6 was placed into a mold with 100 mm diameter and 200 mm height and measured for changes in strength for 28 days. The results are shown in Table 4 below.

TABLE 4

Changes in strength for 28 days in
compositions containing aggregate

| Sample No. | Strength at day 3 (kg/cm$^2$) | Strength at day 3 (kg/cm$^2$) | Strength at day 7 (kg/cm$^2$) | Strength at day 28 (kg/cm$^2$) |
|---|---|---|---|---|
| Sample 1 | 86 | 93 | 108 | 110 |
| Sample 2 | 110 | 114 | 119 | 123 |
| Sample 3 | 10 | 113 | 121 | 126 |
| Sample 4 | 108 | 115 | 125 | 128 |
| Sample 5 | 106 | 113 | 123 | 127 |
| Sample 6 | 94 | 104 | 111 | 120 |

As can be seen in Table 4, the inventive hardened materials containing a mixture of the pulp sludge ashes and the waste gypsum showed excellent strength even when they contained aggregate.

Example 5

Hardened Material Containing Lightweight

The PVA sample 6 of Example 3 was mixed with each of 3 g of perlite (sample 1), 8 g of vermiculite (sample 2), 9 g of talc (sample 3), 3 g of polystyrene foam particles with a size of less than 3 mm (sample 4), 5 g of polyurethane particles with a size of 3 mm (sample 5), and 20 g of wood powders with a size of less than 3 mm (sample 6). Each of the prepared samples 1-6 was placed into a mold with 100 mm diameter and 200 mm height and measured for changes in strength for 28 days. The results are shown in Table 5 below.

TABLE 5

Changes in strength for 28 days in compositions
containing lightweight aggregate

| Sample No. | Strength at day 3 (kg/cm$^2$) | Strength at day 3 (kg/cm$^2$) | Strength at day 7 (kg/cm$^2$) | Strength at day 28 (kg/cm$^2$) |
|---|---|---|---|---|
| Sample 1 | 81 | 88 | 96 | 102 |
| Sample 2 | 86 | 93 | 101 | 106 |
| Sample 3 | 96 | 103 | 110 | 114 |
| Sample 4 | 52 | 61 | 72 | 76 |
| Sample 5 | 57 | 64 | 73 | 78 |
| Sample 6 | 119 | 125 | 131 | 138 |

As can be seen in Table 5, the inventive compositions containing lightweight aggregate had excellent strength even though they were light in weight. Moreover, solidified waste paint may also be used in the inventive compositions.

Example 6

Hardened Material Formed with Injection of Bubbles

The PVA sample 6 of Example 3 was mixed with each of 5 g of bubbles formed by applying compressed air to a vegetable foaming agent (sample A) and 5 g of a cure-controlling agent consisting of 30% aluminum sulfate aqueous solution (sample B). After, the samples were measured for various physical properties, and the results are shown in Table 6 below.

TABLE 6

Test results for compositions containing
bubbles or cure-controlling agent

| No. | Sample name | Hardening time (h) | Compression strength (kg/cm$^2$) | Density (kg/cm$^3$) |
|---|---|---|---|---|
| 1 | Sample A | 13 | 4.5 | 318 |
| 2 | Sample B | 6 | 5.8 | 312 |

As can be seen in Table 6, the compositions containing the pulp sludge ashes and the waste gypsum were excellent in terms of hardening time and strength even when they were injected with the bubbles or contained the cure-controlling agent.

INDUSTRIAL APPLICABILITY

According to the present invention, pulp sludge ashes and waste gypsum, which are generated at large amounts and disposed as wastes, are mixed with each other to prepare a composition. Accordingly, the present invention can maximize the recycling of waste resources and reduce the generation of wastes so as to reduce the sea throwing and underground burying of wastes, thus contributing to the protection of environment.

Also, the present invention allows a reduction in the expense of manufacturers for waste disposal and utilizes waste resources as the main materials of the composition. Thus, the present invention can provide a cost-effective composition with excellent lightweight, flame retardancy and insulation properties, which is suitable for use in building and various industrial fields.

The invention claimed is:

1. A method for producing a recycled hardened material using waste gypsum, comprising adding pulp sludge ashes and water to waste gypsum generated from the treatment of acidic wastewater with calcium hydroxide, thereby obtaining a hardened material rapidly, wherein the mixing ratio between the pulp sludge ashes, the waste gypsum and the water is 50-65 wt %: 10-25 wt %: 10-40 wt %.

2. A method for producing a recycled hardened material using waste gypsum, the method comprising the steps of:
   dehydrating sludge generated from the treatment of acidic wastewater or saline water by means of a filter press so as to form waste gypsum having a water content of 60-80%;
   adding water to the waste gypsum at a ratio of 1 (waste gypsum): 1-1.6 (water) so as to prepare slurry; and
   mixing the slurry with dry pulp sludge ashes.

3. The method of claim 2, wherein the recycled hardened material additionally contains a polymer emulsion at an amount of 5-30 wt % based on the weight of the blended water.

4. The method of claim 3, wherein the polymer emulsion is at least one selected from the group consisting of PVA, EVA, acrylic, urea, melamine, vinyl acetate and silicone resins.

5. The method of claim 2, wherein the recycled hardened material additionally contains at least one selected from the group consisting of sand, gravel, waste foundry sand, zinc slag, copper slag, and waste concrete.

6. The method of claim 2, wherein the recycled hardened material additionally contains at least one selected from the group consisting of pearlite, vermiculite, talc, calcium carbonate, crushed polystyrene foam, crushed polyurethane foam and wood powder.

7. The method of claim 2, wherein the recycled hardened material additionally contains bubbles formed by applying compressed air to an animal/vegetable foaming agent or a mineral foaming agent.

8. The method of claim 2, wherein the recycled hardened material additionally contains at least one cure-controlling agent selected from the group consisting of aluminum sulfate, quick lime, magnesium chloride, calcium chloride and sodium silicate.

* * * * *